United States Patent [19]

Beaupre

[11] 4,310,587
[45] Jan. 12, 1982

[54] FIRE RESISTANT VAPOR BARRIER

[75] Inventor: Peter M. Beaupre, Billerica, Mass.

[73] Assignee: King-Seeley Thermos Company, Prospect Heights, Ill.

[21] Appl. No.: 129,215

[22] Filed: Mar. 11, 1980

[51] Int. Cl.³ .................... B32B 5/22; B32B 5/24; B32B 5/30; B05D 3/06

[52] U.S. Cl. ........................... 428/246; 427/35; 428/285; 428/286; 428/287; 428/328; 428/418; 428/425.8; 428/458; 428/461; 428/463; 428/921; 428/319.1; 428/319.3; 428/311.1; 428/311.5

[58] Field of Search ............. 428/458, 328, 246, 284, 428/285, 286, 287, 315, 425.8, 418, 458, 461, 463, 921; 427/35

[56] References Cited

U.S. PATENT DOCUMENTS

| | | | |
|---|---|---|---|
| 3,640,832 | 2/1972 | Kurz | 428/328 |
| 3,707,433 | 12/1972 | Clough et al. | 428/137 |
| 4,039,709 | 8/1977 | Newman | 428/159 |
| 4,054,710 | 10/1977 | Botsolas | 428/315 |
| 4,054,711 | 10/1977 | Botsolas | 428/228 |
| 4,105,820 | 8/1978 | Antoni | 428/213 |
| 4,158,718 | 6/1979 | Kehl et al. | 428/461 |
| 4,164,605 | 8/1979 | Okawa et al. | 428/920 |
| 4,172,915 | 10/1979 | Sheptak et al. | 428/69 |
| 4,214,026 | 7/1980 | Ibata et al. | 428/458 |
| 4,218,294 | 8/1980 | Brack | 428/416 |
| 4,224,357 | 9/1980 | Iwai et al. | 428/458 |

*Primary Examiner*—William J. Van Balen
*Attorney, Agent, or Firm*—Harness, Dickey & Pierce

[57] ABSTRACT

Disclosed is a fire resistant, flexible vapor barrier sheet comprising a laminate of a metallized substrate sheet and a radiation cured resin layer containing an inorganic pigment. The vapor barrier sheet can be laminated to one side of an insulation bat to provide an attractive, fire resistant insulation product for use in walls of metal buildings and the like.

40 Claims, 7 Drawing Figures

FIRE RESISTANT VAPOR BARRIER

BACKGROUND OF THE INVENTION

The present invention relates to a flexible vapor barrier sheet and to insulation products incorporating the vapor barrier sheet. More particularly, the present invention relates to a flexible substrate sheet having a metallized layer and a radiation cured resin layer laminated thereon. The resin layer contains an inorganic pigment and the vapor barrier sheet has fire resistant characteristics. In a preferred embodiment of the present invention, the flexible laminate sheet is secured to one side of an insulation bat to provide a fire resistant insulation product having a low vapor transmission rate, good insulating properties, and a pleasing appearance.

Vapor barrier sheets are commonly used in conjunction with heat insulating materials, such as fiberglass batting, to provide an insulation product used to line the walls and ceilings of buildings to minimize the cost of heating and cooling the interior spaces thereof. It is, of course, highly desirable that insulation products have both insulation and fire resistant characteristics. A commonly employed insulation product comprises a thickness of fiberglass batting sandwiched between two sheets of kraft paper, one of the sheets having a vapor barrier, such as aluminum foil, laminated thereon. In use, insulation products having a foil vapor barrier have certain limitations, however. For example, the vapor barrier characteristics of foil tend to deteriorate as the foil is subjected to flexing or bending forces. Also, the foil presents a mirrorlike surface which is expensive to overcoat should a white or other appearance be desired. In addition, foil made of aluminum or other metal having a low melting point, may melt under the high temperatures incurred during a fire and, hence, provide little resistance to fire.

To overcome some of the limitations of foil vapor barriers, resin coated vinyl vapor barriers have been proposed. Such vapor barriers, however, are generally made by processes which involve the application of flammable solvent-containing resin precursors to a substrate sheet and subsequent curing or polymerizing of the precursor to a resin. Solvent trapped in the resin during the curing step may cause a deterioration of the fire resistant properties of the vapor barrier. In addition, resin coated vinyl vapor barriers may have vapor transmission rates higher than are desired for some uses.

Wherefore, it is an object of the present invention to provide an improved vapor barrier sheet and insulation products incorporating the sheet. It is another object of the present invention to provide a vapor barrier sheet and insulation products having fire resistant features, including resistance to the propagation of flames and generation of smoke. It is also an object of this invention, to provide a vapor barrier sheet having a low vapor transmission rate such as is suitable for use in conjunction with other insulation material in an insulation product, and wherein the vapor transmission rate does not deteriorate when the vapor barrier sheet is bent. Still another object of this invention is to provide a vapor barrier material which can also serve as an infrared or heat reflector. Yet another object of this invention is to provide a vapor barrier sheet having a desirable physical appearance.

SUMMARY OF THE INVENTION

In accordance with the present invention a fire resistant flexible vapor barrier sheet comprises a laminate of a metallized substrate sheet and a radiation cured resin layer comprising an inorganic pigment in an amount sufficient to impart fire resistant characteristics thereto. In a preferred embodiment of the present invention, the vapor barrier sheet is laminated to a layer of insulation to provide an insulation product having a low vapor transmission rate and good fire resistant properties.

DESCRIPTION OF THE INVENTION

In accordance with the present invention a fire resistant, heat reflective, vapor barrier laminate sheet is provided by laminating a radiation cured, inorganic pigment containing resin layer onto a metallized substrate sheet. The vapor barrier material or sheet of the present invention has fire resistant and smoke resistant characteristics and can be incorporated into an insulation product of the present invention to impart fire and smoke resistant characteristics thereto. It is to be understood that although the following disclosure is cast in terms of a vapor barrier sheet for insulation products, other uses of the vapor barrier sheet are contemplated to be within the broad scope of the present invention.

Figure 1:
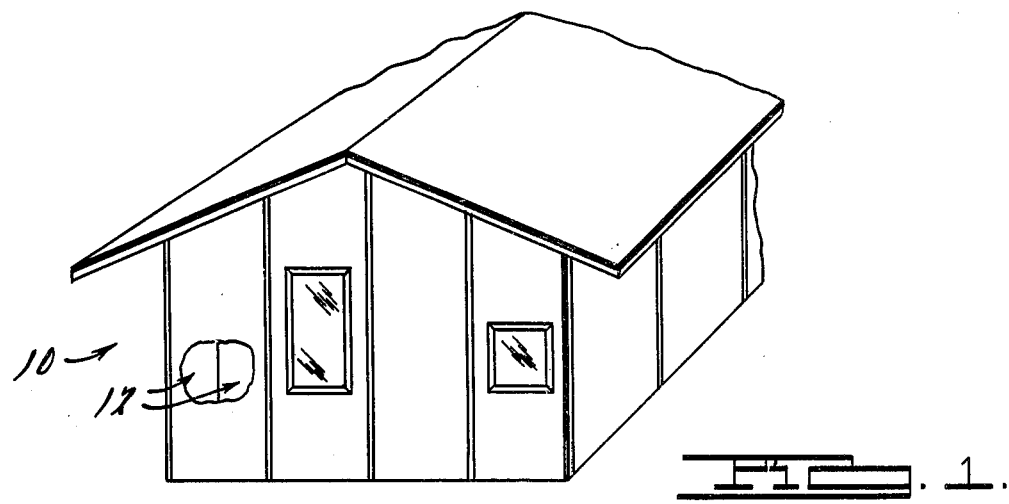
FIG. 1 is a perspective view showing a metal building having an insulation product of the present invention installed thereon.
Figure 2:
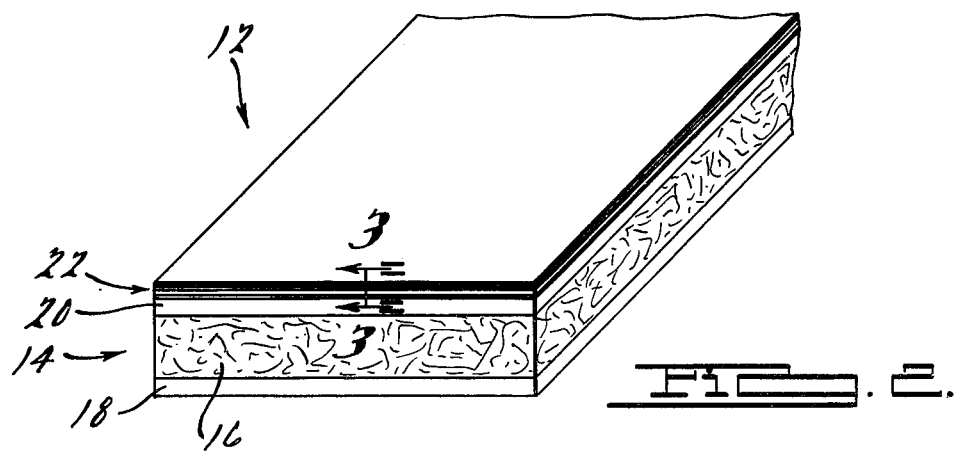
FIG. 2 is a perspective view of the insulation product of the present invention shown in FIG. 1.
Figure 3:
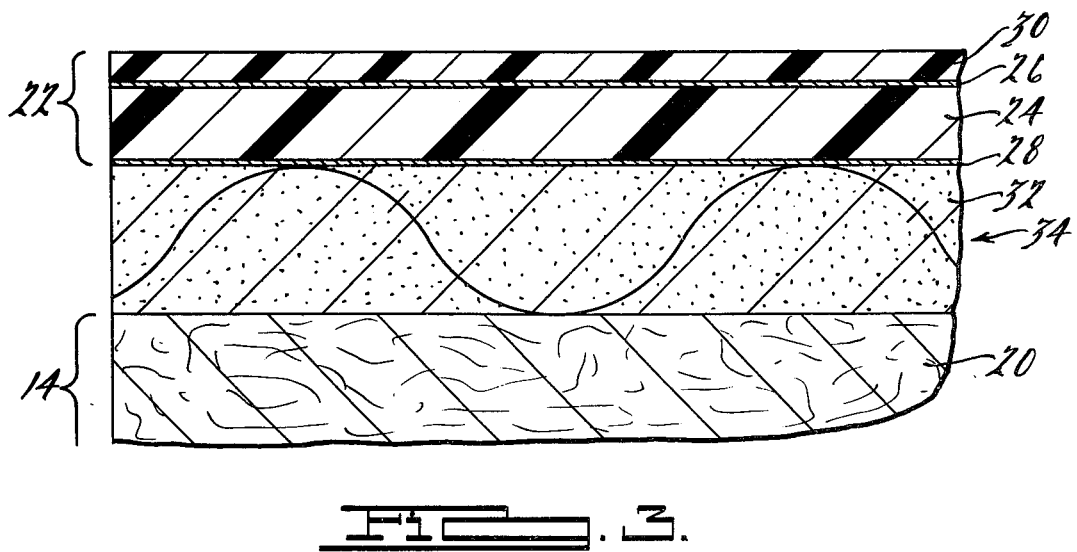
FIG. 3 is a cross-sectional view taken along line 3—3 in FIG. 2.

Now referring to the Figures, FIG. 1 shows a building 10 having a plurality of strips of insulation 12 installed between wall studs to insulate the walls of building 10 as in a conventional manner. As best shown in FIGS. 2 and 3, insulation 12 comprises a laminate of insulation batting 14 and vapor barrier sheet 22. Insulation batting 14 is a conventional insulating material having a thickness of fiberglass fibers 16 between paper sheets 18 and 20. Vapor barrier sheet 22 is a laminate of a flexible substrate sheet 24 which has been metallized on both sides so as to have thin layers of aluminum, 26 and 28, disposed thereon. Disposed on metal layer 26, the metal layer on the side of substrate sheet 24 facing away from batting 14 and adapted to be exposed to the environment exterior of insulation 12, is a continuous layer 30 of a fire resistant radiation cured resin. To bond batting 14 and vapor barrier sheet 22, a layer of adhesive 32 with woven fiberglass reinforcing scrim 34 imbedded therein is interposed therebetween. Suitable adhesives are well known in the art and include conventional hot melt adhesives. The scrim is employed for additional strength and suitable scrim includes fiberglass and nylon woven scrim.

As will be appreciated by those skilled in the art, providing a continuous layer 30 of a fire resistant resin on one side of vapor barrier 22, a fire resistant insulation product with a low vapor transmission rate is obtained even if substrate sheet 24 is of flammable material. Metal layes 26 and 28 enhance the vapor barrier properties of the insulation 12 while resin layer 30 protects the exposed side of insulation 12 from fire. It will, of course, be appreciated that, for some uses, the other side of insulation 12 should be protected from fire either by an analogous vapor barrier sheet or in a conventional manner.

Insulating batting 14 can be a conventional insulating material comprising fiberglass batting fibers sandwiched between layers of kraft paper as shown in FIGS. 1-3. Alternatively, insulation batting 14 can be another insulating material, for example, asbestos fibers, synthetic fibers or other insulating batting. The layer of insulation fibers 16 can be of any thickness suitable for the intended use of the final product. For installations between wall studs, a thickness of about 3 inches would be suitable. Of course, sheets 18 and 20 could comprise a vinyl or other resin material instead of paper. Although the thickness of sheets 18 and 20 can vary, a thickness of 6 or 7 mils would be conventional for paper and suitable for use herein.

Substrate sheet 24 can be a normally flammable substrate sheet such as a polyester sheet, which is preferred for use in the present invention for reasons of economy. Other suitable substrate sheets can be made of, for example, polyester, polycarbonate, polypropylene, polyethylene, polyamide, paper, aluminum foil, and cellophane. It should be noted, however, that for most uses, substrate sheet 24 should have a melting point of at least 190° F. in order to afford the desired degree of fire resistance. Thus, if a low melting plastic such as polyethylene is employed, an additive should be incorporated in the plastic to raise its melting point to a level satisfactory for the intended use. The thickness of substrate sheet 24 can be, for example, on the order of ½ mil.

Thin metal layers 26 and 28 can be provided on substrate sheet 24 by conventional metallizing techniques such as by vacuum metallizing. Alternate metallizing techniques include thermal or catalytic decomposition, electrolytic and electroforetic deposition, sputtering and ion deposition techniques. The metallizing can be carried out conventionally at high reates normally associated with the processing of plastic films. The metal layers are preferably very thin. For example, a thickness of less than 0.01 mil, is suitable for use herein. Although the metal layers can comprise aluminum, copper, chromium, nickel, gold, silver, and the like, for reasons of economy, a thin layer of aluminum applied by vacuum metallizing is preferred for use in the present invention.

Radiation cured resin layer 30 is a resin layer which does not support combustion under the conditions of use contemplated. In accordance with the present invention, this result is obtained by employing a resin precursor mixture which, upon radiation curing, yields a resin having the desired fire resistant properties. Where a precursor of a flammable resin is employed, the desired fire resistant properties, in addition to light reflecting and high heat reflectivity characteristics, can be obtained by employing a resin precursor mixture which consists essentially of reactive monomers or oligomers which will substantially completely polymerize during radiation curing and an inorganic pigment in an amount effective to impart fire retardant characteristics to the resin. Products of this invention are capable of passing smoke and flame tests such as ASTM E84-61.

It is important that the resin precursor of the present invention be of a substantially all solids or solvent free nature. Less than 10% and preferably less than 1% of organic monomeric or oligomeric precursor material should remain after the precursor has been cured. Resin precursors having a significant quantity of non-polymerizing solvent therein are not satisfactory for use herein as the solvent is flammable and hence, provides fuel for flames which would be detrimental to the flame and smoke retardant characteristics of the present invention. Suitable radiation curable resin precursors are commmercially available and include polyester, urethane, acrylic, epoxy and vinyl-based resin precursors and mixtures thereof. Preferred resin precursors are acrylate based and urethane based resin precursors.

In accordance with the present invention, it has been found that even normally flammable radiation cured resins can be employed herein so long as the resin contains an inorganic pigment in an amount sufficient to provide flame and smoke retardant characteristics thereto. The inorganic pigment material preferred for use in the present invention is titanium dioxide ($TiO_2$). Titanium dioxide is preferred because it provides the desired fire retardant characteristics while also providing a white color to the resin which not only provides a pleasing and practical, light reflecting appearance for use in the interior of metal buildings and the like, but also serves to assist the remainder of the insulation product in reflecting heat. It is contemplated, however, that for some uses other inorganic pigments which can impart fire retardant to the radiation cured resin are within the broad scope of the present invention. Examples of such other inorganic pigments include metallic oxides, carbonates, and sulfates, including, more specifically, iron oxide, magnesium oxide, barrium carbonate, magnesium carbonate, calcium carbonate, chalk, calk, and the like.

Resin layer 30 can be a thin layer, for example, 0.2 mils in thickness, with satisfactory results. For most uses, thin layers of resin are preferred to minimize the quantity of resin precursor employed. To obtain a thin layer 30, it is desirable that a resin precursor of low viscosity be applied to metal layer 26 of substrate sheet 24. For example, resin precursors of a viscosity of 300 to 500 centipoise at the temperatures to which they are applied to the substrate are suitable for use herein. Of course, resin precursors of greater or lesser viscosity can also be employed depending upon the type of coating equipment, desired thickness of layer 30, coating line speed, etc. The resin precursors can be applied to the substrate sheet by means of a finely etched reverse gravure roll or an off-set gravure of, for example, 100 to 300 quad. Of course, any method capable of coating a film of resin precursor mix onto the substrate sheet can be used.

After application of the resin precursor to the substrate material, the resin precursor can be cured by means of electron beam apparatus such as disclosed in U.S. Pat. No. 3,702,412, Nov. 7, 1972 to Quintal; U.S. Pat. No. 3,769,600, Oct. 30, 1973, to Denholm et al.; and U.S. Pat No. 3,780,308, Dec. 18, 1973, to Nablo. Suitable machines are available commercially from Energy Sciences, Inc., of Burlington, Mass. under the trade name "Electro Curtain ®." These machines provide an electron beam or curtain transverse to movement of a substrate web contacted thereby and can provide a beam or sheet of 2 to 3 megarads over 50 to 70 inches of web width, which is suitable to cure the resin film in accordance with the present invention. Preferably, an inert gas is passed over the coated web in the beam working zone to limit oxygen contamination. The inert gas is passed over the coated web in the beam working zone to limit oxygen contamination. The inert gas may comprise argon, nitrogen, or the like.

Figure 4:
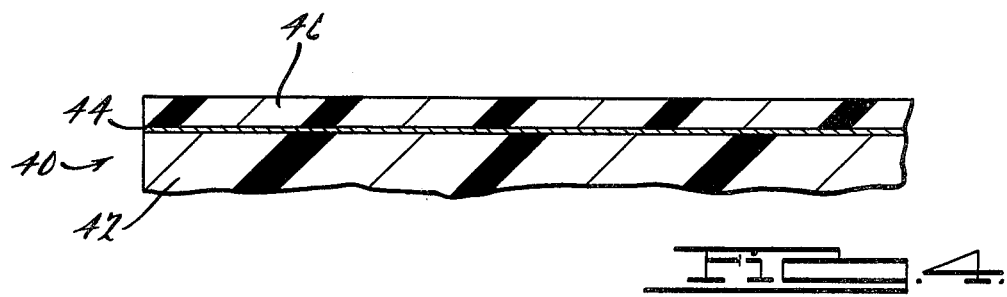
FIG. 4 is a cross-sectional view, broken away, showing an alternative embodiment of the present invention.

Now referring to FIG. 4, an alternative embodiment of the present invention is shown and indicated generally by the numeral 40. Vapor barrier sheet 40 comprises a substrate sheet 42 which has a continuous metal layer 44 deposited thereon, and which has a radiation cured continuous resin layer 46 laminated on said metallized layer 44. Radiation cured layer 46 is analogous to radiation cured layer 30 of the previously disclosed embodiments and preferably consists essentially of a radiation cured resin containing an inorganic pigment such as titanium dioxide. Metal layer 44 provides excellent vapor transmission resistance for vapor barrier sheet 40 while resin layer 46 provides flame retardation and fire resistant properties to the underlying substrate layer 42. Substrate layer 42 can be laminated to further layers, if desired, which layers will be fire protected on the side of vapor barrier sheet 40. Thus, it is contemplated that vapor barrier sheet 40 can be laminated to window shades, wall paper including insulative wall paper, heating and cooling ducts, pipes, and other insulation materials or objects to be insulated to take advantage of the heat reflecting, light reflecting, vapor barrier, fire resistant and insulative properties of the vapor barrier sheet of the present invention.

Figure 5:
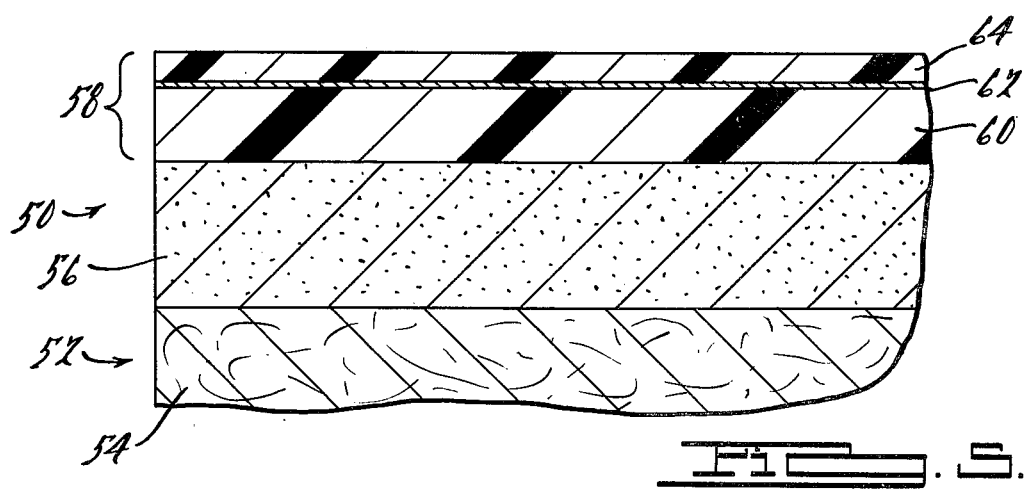
FIG. 5 is a cross-sectional view, broken away, showing another alternative embodiment of the present invention.

Now referring to FIG. 5, yet another alternative embodiment is illustrated and indicated generally by the numeral 50. Insulation 50 is similar to insulation 12 of FIG. 3. However, insulation 50 has only one metal layer and does not employ scrim. Thus, insulation 50 has insulation batting 52 analogous to insulation batting 14 and which comprises insulation fibers sandwiched between two paper sheets, one of which, paper sheet 54, is shown broken away in FIG. 5. Paper sheet 54 is laminated by a layer of adhesive 56 (without scrim) to a vapor barrier laminate 58 of the present invention. It, of course, will be understood that scrim could optionally be imbedded in adhesive 56 as in the first embodiment. Vapor barrier laminate 58 comprises a substrate sheet 60 which has been metallized on the side thereof facing away from insulation batting 52 to provide a metal layer 62 thereon. A radiation cured resin layer 64 is provided on metal layer 62. Substrate 60, metal layer 62 and radiation cured resin layer 64 are each analogous to previously disclosed substrate sheets 24, metal layer 26, and radiation cured resin layer 30.

Figure 6:
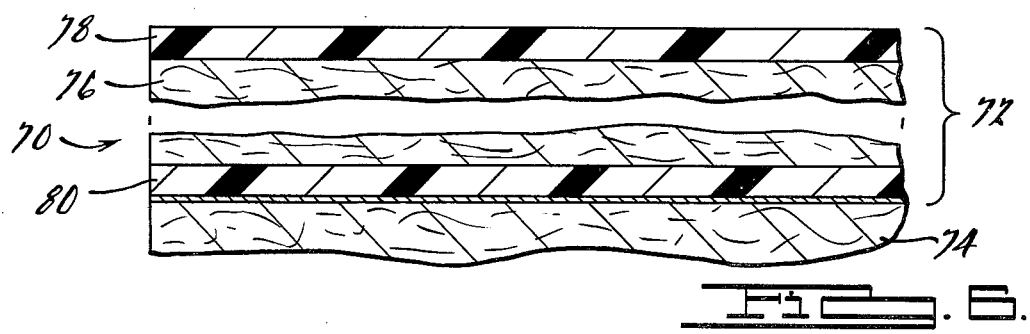
FIG. 6 is a cross-sectional view, broken away, showing yet another embodiment of the present invention.

Now referring to FIG. 6, still another alternative embodiment of the present invention is illustrated and indicated generally by the numeral 70. Insulation 70 comprises a vapor barrier sheet, indicated by bracket 72, to which is laminated an insulation sheet 74 such as a polyurethane foam sheet. Vapor barrier sheet 72 comprises a paper substrate 76 which has radiation cured resin layers 78 and 80 on each side thereof. Resin layer 80 which faces insulation sheet 74 has metal layer 82 laminated or deposited thereon. Radiation cured resin layer 78, and metal layer 82 are analogous to earlier disclosed layers 30 and 26 or 28. Thus, radiation cured resin layer 78 preferably comprises an inorganic pigment in an amount sufficient to provide fire-resistant properties thereto. However, although radiation cured resin layer 80 can be analogous to layer 30, resin layer 80 need not necessarily be fire resistant since it is protected by the remainder of vapor barrier 70. Of course, it will be appreciated that insulation 70 is well suited for use in insulative wall paper, duct or pipe wrapping window shades and the like.

Figure 7:
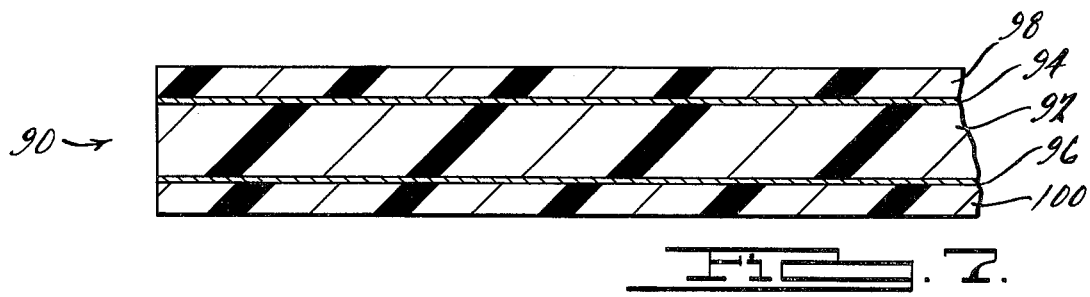
FIG. 7 is a cross-sectional view, broken away, showing still another alternative embodiment of the present invention.

Now referring to FIG. 7, another alternative embodiment of the present invention is shown and indicated generally by the numeral 90. Vapor barrier laminate 90 comprises a substrate sheet 92, metallized layers 94 and 96 on each side of substrate sheet 92, and radiation cured resin layers 98 and 100, respectively, on each metallized or metal layer 94 and 96. Each resin layer 98 and 100 is analogous to previously disclosed resin layer 30 and preferably comprises an inorganic pigment in an amount sufficient to provide fire-retardation characteristics thereto. It will be appreciated that vapor barrier sheet 90 is well adaptable for many uses alone or in conjunction with other materials.

The following example is offered to further illustrate the present invention.

EXAMPLE

A roll of one-half mil polyester is unrolled and passed through a conventional vacuum metallizing chamber maintained at about $5 \times 10^{-4}$ torr and in which the polyester film is passed over a source of aluminum heated to about 1350° C. The side of the polyester film facing the source of aluminum is coated with a thin layer of aluminum in a conventional manner at a film speed of about 500 feet per minute. The layer of aluminum deposited onto the polyester film is of a thickness of about 1 microinch. The polyester film is then wound onto a takeup roller and removed from the vacuum chamber.

Next, the metallized polyester film is unrolled and passed through an offset gravure printing station which has a 150 quad impression roller and which coats a thin film of a radiation curable acrylic resin precursor onto the metallized side of the metallized polyester film. The precursor has a viscosity of about 400 centi-poise and comprises a mixture of about 80% Mobil 78E-363 and 20% Mobil 79E-120 radiation curable resin precursor. The mixture contains about 36% titanium dioxide. The precursor mixture is applied to the metallized polyester film in a layer which is about 0.2 mils thick. The precursor mixture is then contacted with a curtain of electron beam radiation until the resin is cured as is evidenced by a lack of tack of sticky feel when touched. The metallized polyester film with the cured layer of resin thereon is then wound onto a roller and transported to another station where it is laminated to a conventional insulation batting comprising fiberglass insulation sandwiched between two layers of kraft paper. The lamination is accomplished by placing a layer of woven nylon scrim and adhesive between the non-metallized side of the polyester film and the insulation bat.

The resulting insulation product can be flexed a substantial number of times without significantly changing the vapor barrier characteristics thereof and has a decorative white exterior facing layer which provides both light and heat reflecting characteristics as well as imparting a flame and smoke resistance to the product. The product is particularly well adapted for use as wall and ceiling insulation in metal buildings and the like.

Substantially similar results are obtained by following the above example but passing the polyester film twice through the metallizer to provide a metallized layer on both sides of the polyester film. The radiation cured resin layer is then provided on either metal layer and the insulation batting is bonded by means of adhesive (and embedded scrim) to the side of the polyester film facing away from the radiation cured layer. Both of the above procedures are also followed except that the scrim is committed with satisfactory results although the products have reduced mechanical strength. Still other alternative embodiments, such as those shown in FIGS. 4–7, are made by laminating the desired layers in an analogous fashion.

It is evident that those skilled in the art, once given the benefit of the foregoing disclosure, can now make numerous other uses and modifications of and departures from the specific embodiments described without departing from the inventive concept of the present invention. Consequently, the present invention is to be construed as limited solely by the scope and spirit of tne appended claims.

What is claimed is:

1. A vapor barrier comprising a laminate of a metallized substrate sheet and a continuous layer of radiation cured resin having fire resistant characteristics.

2. A vapor barrier as recited in claim 1 wherein said radiation cured resin is a flammable resin and said continuous layer comprises an inorganic pigment in an amount sufficient to impart fire resistance thereto.

3. A vapor barrier as recited in claim 2 wherein said inorganic pigment is titanium dioxide.

4. A vapor barrier as recited in claim 3 wherein said substrate sheet is a polyester sheet.

5. A vapor barrier as recited in claim 1 comprising additional layers of an insulation bat sandwiched between two paper sheets, one of said sheets being secured to said metallized substrate sheet.

6. A vapor barrier as recited in claim 5 wherein said substrate sheet is metallized on both sides.

7. A vapor barrier as recited in claim 6 wherein said inorganic pigment is titanium dioxide.

8. A vapor barrier comprising a metallized polyester sheet having laminated on one side thereof, a continuous layer of radiation cured resin containing titanium dioxide in an amount sufficient to impart fire resistance thereto, and further having secured on the other side thereof an insulation material.

9. A vapor barrier as recited in claim 8 wherein said polyester sheet is metallized with aluminum.

10. A vapor barrier as recited in claim 9 wherein said polyester sheet is metallized on both sides, said insulation material comprises fibrous batting, and a layer of scrim is disposed between said insulation material and said metallized polyester sheet.

11. A vapor barrier comprising a substrate sheet having metallized layer on one side thereof and a radiation cured resin layer on one of said metallized layer or the other side of said substrate sheet, said radiation cured resin layer containing an inorganic pigment in an amount effective to inhibit flame propagation by said resin.

12. A vapor barrier as recited in claim 11 wherein said radiation cured resin layer is on said metallized layer.

13. A vapor barrier as recited in claim 11 wherein said radiation cured resin is on said other side of said substrate sheet.

14. A vapor barrier as recited in claim 11 wherein an insulating material is secured to one of said metallized layer or said substrate sheet.

15. A vapor barrier as recited in claim 14 wherein said insulating material is polyurethane foam.

16. A vapor barrier as recited in claim 14 wherein said insulating material comprises a fibrous batting.

17. A vapor barrier as recited in claim 14 wherein said substrate sheet has metallized layers on both sides thereof and said resin layer is laminated to one of said metallized layers.

18. A vapor barrier as recited in claim 17 wherein said insulating material is a fiberglass batting.

19. A vapor barrier as recited in claim 14 wherein said insulating material is secured to said metallized layer.

20. A vapor barrier as recited in claim 14 wherein said insulating material is secured to said substrate sheet.

21. A vapor barrier as recited in claim 11 wherein said inorganic pigment is selected from the group consisting of metallic oxides and metallic carbonates and mixtures thereof.

22. A vapor barrier as recited in claim 21 wherein said inorganic pigment is selected from the group consisting of iron oxide, titanium dioxide, barium carbonate, magnesium oxide, magnesium carbonate, and calcium carbonate.

23. A vapor barrier as recited in claim 11 wherein said substrate comprises a sheet selected from the group consisting of paper, plastic, and foil.

24. A vapor barrier comprising a laminate of a substrate sheet sandwiched between continuous layers of a radiation cured resin, one of said resin layers comprising an inorganic pigment in an amount effective to impart fire resistance thereto and one of said layers having a metal layer disposed thereon.

25. A vapor barrier as recited in claim 24 wherein one of said layers comprises an inorganic pigment and the other of said resin layers has a metal layer thereon.

26. A vapor barrier as recited in claim 25 wherein said inorganic pigment is selected from the group consisting of metallic oxides and metallic carbonates and mixtures thereof.

27. A vapor barrier as recited in claim 26 wherein said inorganic pigment is selected from the group consisting of iron oxide, titanium dioxide, barium carbonate, magnesium oxide, magnesium carbonate and calcium carbonate.

28. A vapor barrier as recited in claim 25 wherein said inorganic pigment is titanium dioxide.

29. A vapor barrier as recited in claim 25 wherein an insulating material is secured to said metal layer.

30. A vapor barrier as recited in claim 29 wherein said insulating material is an insulating batting.

31. A vapor barrier as recited in claim 25 wherein said substrate sheet is paper.

32. A vapor barrier comprising a laminate of a substrate sheet sandwiched between continuous metal layers each having a layer of a radiation cured resin thereon, each of said radiation cured resin layers comprising an inorganic pigment in an amount effective to impart fire resistance thereto.

33. A vapor barrier as recited in claim 32 wherein said inorganic pigment is selected from the group consisting of metallic oxides and metallic carbonates and mixture thereof.

34. A vapor barrier as recited in claim 33 wherein said inorganic pigment is selected from the group consisting of iron oxide, titanium dioxide, barium carbonate, magnesium oxide, magnesium carbonate and calcium carbonate.

35. A vapor barrier as recited in claim 32 wherein said inorganic pigment is titanium dioxide.

36. The method of making a normally flammable vapor barrier sheet fire resistant, comprising the steps of:
(A) metallizing a substrate sheet;
(B) coating a thin continuous film of resin precursor on the product of step (A); and
(C) radiation curing said resin precursor, said resin precursor comprising an inorganic pigment in an amount effective to impart fire resistance thereto.

37. A method as recited in claim 36 wherein said inorganic pigment is titanium dioxide.

38. A method as recited in claim 37 wherein said sheet comprises a polyester material.

39. A method as recited in claim 36 wherein said inorganic pigment is selected from the group consisting of metallic oxides and metallic carbonates and mixtures thereof.

40. A method as recited in claim 39 wherein said inorganic pigment is selected from the group consisting of iron oxide, titanium dioxide, barium carbonate, magnesium oxide, magnesium carbonate and calcium carbonate.

* * * * *